(12) United States Patent
Fontaine et al.

(10) Patent No.: US 10,468,882 B2
(45) Date of Patent: Nov. 5, 2019

(54) METHOD FOR MANAGING THE ELECTRICITY USE OF A PLURALITY OF HOUSEHOLD APPLIANCES OF A LOCAL COMMUNICATION NETWORK

(71) Applicant: ORANGE, Paris (FR)

(72) Inventors: Fabrice Fontaine, Geveze (FR); Han Yan, Puteaux (FR)

(73) Assignee: ORANGE, Paris (FR)

( * ) Notice: Subject to any disclaimer, the term of this patent is extended or adjusted under 35 U.S.C. 154(b) by 95 days.

(21) Appl. No.: 15/129,734

(22) PCT Filed: Mar. 20, 2015

(86) PCT No.: PCT/FR2015/050712
§ 371 (c)(1),
(2) Date: Sep. 27, 2016

(87) PCT Pub. No.: WO2015/145048
PCT Pub. Date: Oct. 1, 2015

(65) Prior Publication Data
US 2017/0133848 A1    May 11, 2017

(30) Foreign Application Priority Data

Mar. 27, 2014   (FR) ...................... 14 52655

(51) Int. Cl.
*H02J 3/14*    (2006.01)
*H04L 12/28*   (2006.01)
(Continued)

(52) U.S. Cl.
CPC .............. *H02J 3/14* (2013.01); *G05B 19/042* (2013.01); *H02J 13/0017* (2013.01);
(Continued)

(58) Field of Classification Search
None
See application file for complete search history.

(56) References Cited

U.S. PATENT DOCUMENTS 8,868,248 B2 * 10/2014 Park ....................... G06Q 10/00
                                                                 700/295
9,649,009 B2 *  5/2017 Grimminger ....... A47L 15/0047
(Continued)

FOREIGN PATENT DOCUMENTS

EP            2647756 A2    10/2013

OTHER PUBLICATIONS

French Search Report dated Dec. 19, 2014 for corresponding French Application No. 1452655, filed Mar. 27, 2014.
(Continued)

*Primary Examiner* — Van H Nguyen
(74) *Attorney, Agent, or Firm* — David D. Brush; Westman, Champlin & Koehler, P.A.

(57) ABSTRACT

A method for managing electricity use of a plurality of household appliances connected within a local communication network and having one or more operating phases. The method includes the following steps, implemented by a data processing module: acquiring information related to the operating phases, in progress or forthcoming, for at least two household appliances, the information related to an operating phase for a household appliance including the power used by the household appliance during the phase; determining, on the basis of the acquired information, at least one operating phase of one of the appliances to be interrupted so as to minimize peak power use; and interrupting the determined operating phase.

10 Claims, 9 Drawing Sheets

(51) Int. Cl.
*G05B 19/042* (2006.01)
*H02J 13/00* (2006.01)
*H04L 29/08* (2006.01)

(52) U.S. Cl.
CPC ...... *H04L 12/2803* (2013.01); *H04L 12/2827* (2013.01); *G05B 2219/2639* (2013.01); *H02J 2003/143* (2013.01); *H04L 67/10* (2013.01); *H04L 2012/284* (2013.01); *Y02B 70/325* (2013.01); *Y02B 70/3225* (2013.01); *Y02B 70/3266* (2013.01); *Y04S 20/222* (2013.01); *Y04S 20/228* (2013.01); *Y04S 20/242* (2013.01)

(56) References Cited

U.S. PATENT DOCUMENTS

| | | | |
|---|---|---|---|
| 9,837,820 B2* | 12/2017 | Santinato | H02J 3/008 |
| 2010/0060079 A1 | 3/2010 | MacLellan et al. | |
| 2011/0264932 A1* | 10/2011 | Park | H02J 3/14 |
| | | | 713/310 |
| 2012/0147802 A1 | 6/2012 | Ukita et al. | |
| 2013/0030590 A1 | 1/2013 | Prosser | |
| 2013/0038468 A1* | 2/2013 | Wang | H02J 3/14 |
| | | | 340/870.02 |
| 2013/0131883 A1 | 5/2013 | Yamada | |
| 2013/0173079 A1* | 7/2013 | Taira | H04L 12/2829 |
| | | | 700/296 |

OTHER PUBLICATIONS

English translation of the Written Opinion of the International Searching Authority dated Jun. 2, 2015, for corresponding International Application No. PCT/FR2015/050712, filed Mar. 20, 2014.
Written Opinion of the International Searching Authority dated Jun. 2, 2015, for corresponding International Application No. PCT/FR2015/050712, filed Mar. 20, 2014.
International Search Report dated Jun. 2, 2015, for corresponding International Application No. PCT/FR2015/050712, filed Mar. 20, 2014.

* cited by examiner

METHOD FOR MANAGING THE ELECTRICITY USE OF A PLURALITY OF HOUSEHOLD APPLIANCES OF A LOCAL COMMUNICATION NETWORK

CROSS-REFERENCE TO RELATED APPLICATIONS

This Application is a Section 371 National Stage Application of International Application No. PCT/FR2015/050712, filed Mar. 20, 2015, the content of which is incorporated herein by reference in its entirety, and published as WO 2015/145048 on Oct. 1, 2015, not in English.

GENERAL TECHNICAL FIELD

The aim of the invention is energy optimisation and more precisely relates to a solution for controlling the maximum electric power consumed by a plurality of domestic appliances connected within a local communications network.

PRIOR ART

Usually, a household comprises many domestic appliances capable of using substantial electric power, such as electrical appliance such as a dishwasher, a washing machine or even a dryer. Such appliance consumes electricity irregularly according to different operating phases. If a user decides to run several domestic appliances at the same time, the power consumption of the latter adds up. Such a concomitant operation of several power-hungry devices produces a consumption peak, potentially considerable if the operating phases of the different machines in operation maximise power consumed at the same time. Such a consumption peak is often evident in early evening when an individual returning from work initiates operating phases of several electrical appliances in his household at the same time.

Unfortunately, the same behaviour can be observed in a majority of individuals. The domestic power consumption peaks described hereinabove are reported in a majority of households, which generates a national consumption peak. Such a peak can be highly damaging if the total power called on by appliance exceeds the instantaneous power which can be delivered over the network by the electricity production appliance connected to it. The electric network in fact risks falling out, causing cutting of the electric supply to an entire region, or even a national blackout. Apart from the unpleasant situation for those concerned, such a cut can be the cause of substantial damage and cause for example death in those requiring urgent medical care, or else accidents caused by heating or substitution lighting means such as intoxication via carbon monoxide or fires caused by candles or chimney fires.

A first existing solution for reducing such consumption peaks consists of encouraging the user of domestic appliances to not exceed maximum power consumption, as the program "Ecowatt" in France does. Similarly, the user can be encouraged to consume more during the day and periods of the day with low general consumption, if needed by means of more advantageous rates such as in terms of "peak and off-peak hours" and "Tempo" EDF contracts in France or contracts proposed by Ontario Electricity Board in the USA. But if such a solution rests solely on the good will of the user then its results are highly random and require action on the part of the user.

Other solutions limit the electric power which can be called restrictively, for example by imposing a consumption threshold value not to be exceeded. Such a limitation can be accompanied by a list of priority domestic appliances and impose cutting of non-priority appliance over preset time ranges or else in the event where this threshold value is exceeded. But such solutions can considerably degrade appliance performance and therefore the user experience, for example if appliance is cut off suddenly right in the middle of a wash cycle.

There is therefore a need for a solution for limiting total maximum power consumption or consumption peak of a plurality of domestic appliances without any need for action on the part of the user of these appliances and without degrading the performances of these appliances.

PRESENTATION OF THE INVENTION

According to a first aspect the present invention relates to a method for managing the power consumption of a plurality of domestic appliances connected within a local communications network, the operation of at least two domestic appliances having one or more operating phases, said method comprising the following steps implemented by a data-processing module capable of being connected to the local communications network:

acquisition of information relative to operating phases in progress or yet to come for at least two domestic appliances, the information relative to an operating phase for a domestic appliance comprising the power consumed by said domestic appliance during this phase, determination as a function of the acquired information, of at least one operating phase of one of said appliances to be interrupted so as to minimise the total maximum power consumed by said at least two domestic appliances, so-called consumption peak, interruption of said determined operating phase.

Such a method minimises the maximum power consumed by a set of appliances without the need for actions on the part of the user or degradation of the quality of services provided by these appliances.

The processing module can acquire information relative to operating phases in progress or yet to come of domestic appliances, after start-up by one of said domestic appliances of a new operating phase or the pausing by the user of an operating phase.

This lets the processing module update its consumption projections following the occurrence of an event such as start-up of an operating phase or pausing by a user of an operating phase.

So as to take into account updates of projected consumption undertaken by an appliance during an operating phase, the data-processing module can also repeatedly acquire information relative to operating phases of domestic appliances.

In an embodiment of the method according to the first aspect, information relative to an operating phase of a domestic appliance can comprise a maximum interruption duration of said phase and said processing module can interrupt said determined operating phase during an interruption duration of less than or equal to the maximum interruption duration.

This embodiment ensures that the programmed interruption duration of an operating phase of an appliance will not degrade the quality of the service provided to the user by this appliance.

Said processing module can interrupt said determined operating phase during an interruption duration equal to the duration of the consumption peak, when the maximum interruption duration is greater than or equal to the duration of the consumption peak.

Over time this sufficiently offsets power consumption by the appliance to reduce total power consumption throughout the previously estimated consumption peak.

Said processing module can interrupt said determined operating phase by an interruption duration equal to the maximum interruption duration when the maximum interruption duration is less than the duration of the consumption peak. This reduces to a maximum the duration of the consumption peak without altering the service provided by the appliance whereof one of the phases is interrupted.

In a variant of implementation of the method according to the first aspect, the data-processing module can determine at least one operating phase of one of said appliances to be interrupted so as to further minimise the interruption duration of the operating phases of domestic appliances.

This variant minimises inconvenience caused to the user by realisation of the method by delaying to a minimum the end of execution of the final operating phase of the appliance whereof an operating phase is interrupted.

Also, prior to the determination step of at least one operating phase to be interrupted the data-processing module can compare the amplitude of the consumption peak to a preset threshold.

This does not execute phase interruption if total maximum consumption stays sufficiently low so as not to slow execution of the operating phases without specific need.

The processing module can finally program interruption of said operating phase at a later time.

This programs phase interruption at a later time if such a future interruption is more significant than an immediate interruption from the point of view of minimisation of the consumption peak.

According to a second aspect, the invention relates to a data-processing module capable of being connected to a local communications network and configured to:

acquire information relative to operating phases in progress or yet to come for at least two domestic appliances connected within the local communications network and functioning according to several operating phases, said information relative to an operating phase for a domestic appliance comprising the power consumed by said domestic appliance during this phase, determine as a function of the acquired information, at least one operating phase of one of said appliances to be interrupted so as to minimise the total maximum power consumed by said at least two domestic appliances, so-called consumption peak, interrupt said determined operating phase.

According to a third aspect, the invention relates to a gateway comprising a data-processing module according to the second aspect.

According to a fourth aspect, the invention relates to a system for managing the power consumption comprising a plurality of domestic appliances connected within a local communications network and a gateway according to the third aspect.

Finally, according to a fifth aspect, the invention relates to a computer program product comprising code instructions for executing a method for managing the power consumption of a plurality of domestic appliances according to the first aspect when this program is executed by a processor.

Such processing module, gateway, management system and computer program product have the same advantages as those mentioned for the method according to the first aspect.

PRESENTATION OF THE FIGURES

Other characteristics and advantages of the present invention will emerge from the following description of an embodiment of the invention. This description will be given in reference to the appended drawings, wherein.

DETAILED DESCRIPTION

Figure 1:
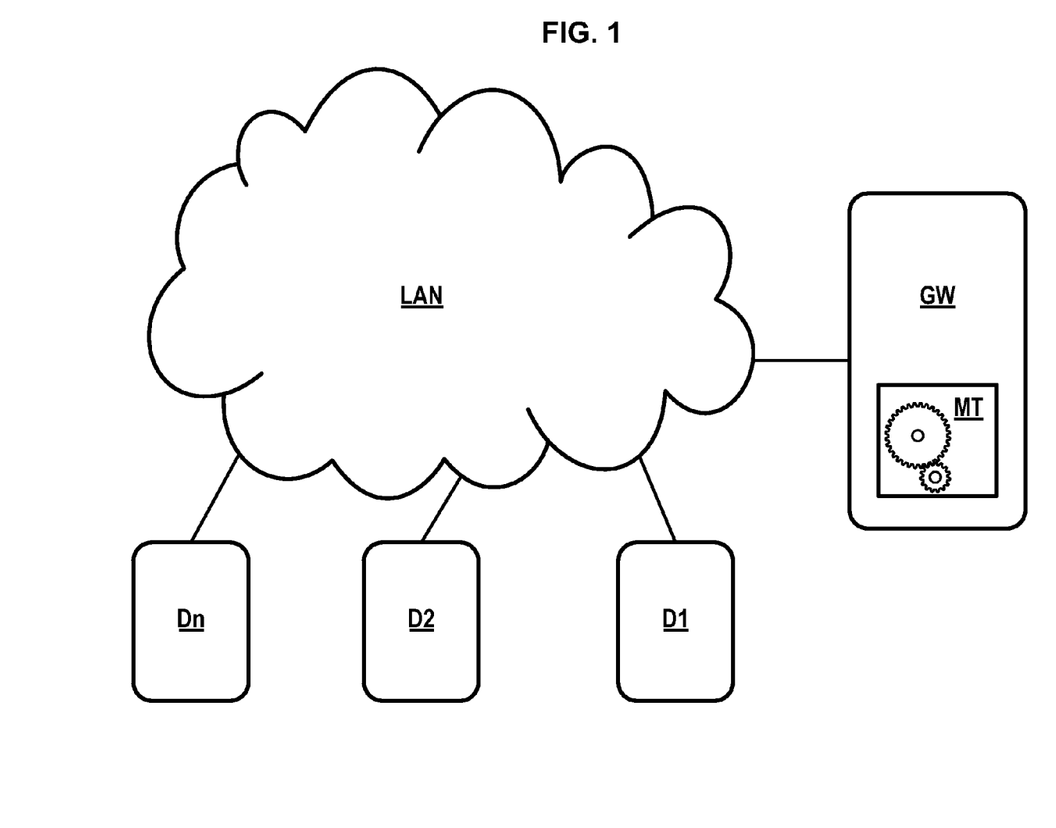
FIG. 1 illustrates a system for managing the power consumption of a plurality of domestic appliances according to an embodiment of the invention.

In reference to FIG. 1, an embodiment of the invention relates to a power consumption management system comprising a plurality of domestic appliances D1, D2, . . . , Dn connected within a local communications network LAN.

Local communications network means a network of LAN type ("Local Access Network"). This network can be in particular a home network or a corporate network, and is most often centred on a gateway which in particular is an Internet access box (a "box") of the household or of the business.

The network can also be a wired network of Ethernet type, according to the standard IEEE 802.3, a wireless network of Wi-Fi type, according to the standard IEEE 802.11, or 3G or else a combination of both. The link can be direct or can use an intermediate appliance such as PLC boxes.

Domestic appliances D1 to Dn can be any domestic appliances having a wired or wireless network connection.

For example, these domestic appliances can be electrical appliances such as a dishwasher, a dryer, a washing machine, a refrigerator, a freezer etc.

These domestic appliances have one or more operating phases during their operation.

Figure 2:
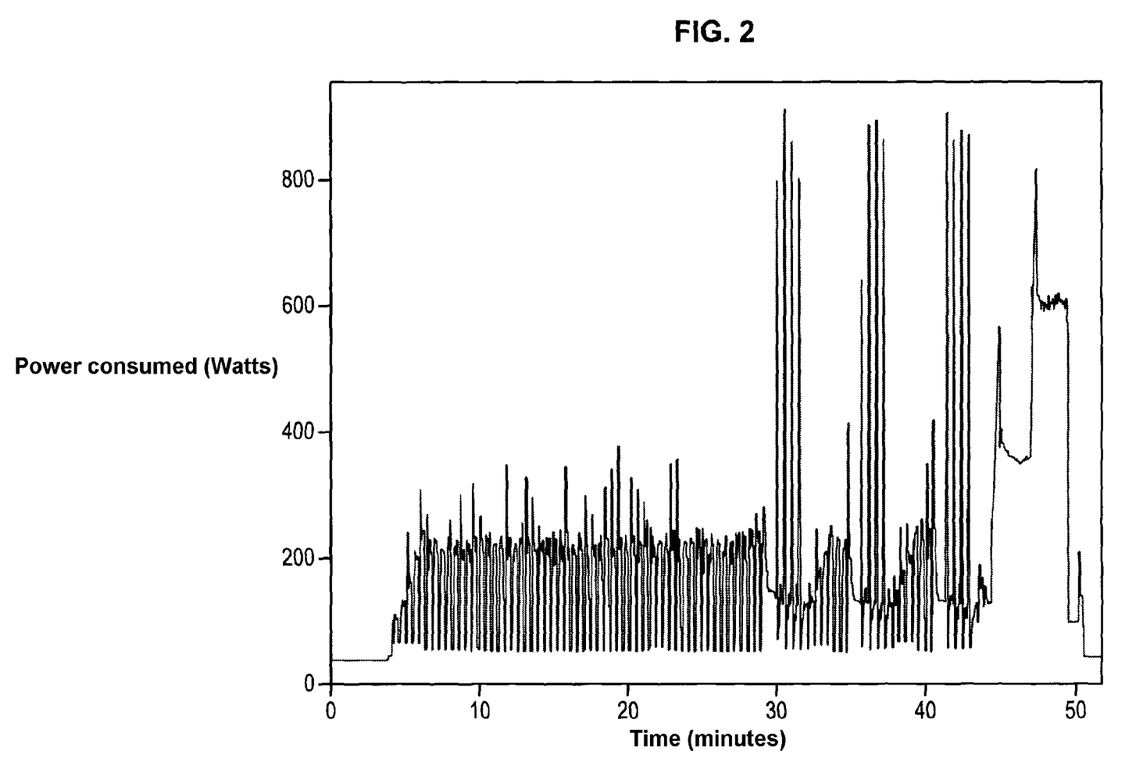
FIG. 2 illustrates the different operating phases of a washing machine.

By way of first example and as illustrated in FIG. 2, a washing machine has a washing phase then a spin phase. By way of second example and as illustrated in FIGS. 3a, 3b, 3c, 3d, a dishwasher has a first wash phase, a pause phase, a second wash phase and a drying phase.

Consumed power can be associated with each operating phase of a domestic appliance, such as the maximum power consumed, by said domestic appliance during this phase. As a variant the average power consumed by said appliance can be associated with each phase. A duration of the phase can also be associated with each appliance operating phase.

By way of first example and as illustrated in FIG. 2, a washing machine can have a first operating phase corresponding to a washing phase of a duration of 25 minutes with power consumed of 400 Watt as well as a second operating phase corresponding to a spin phase of a duration of 30 minutes with power consumed of 1000 Watt.

Figure 3A:
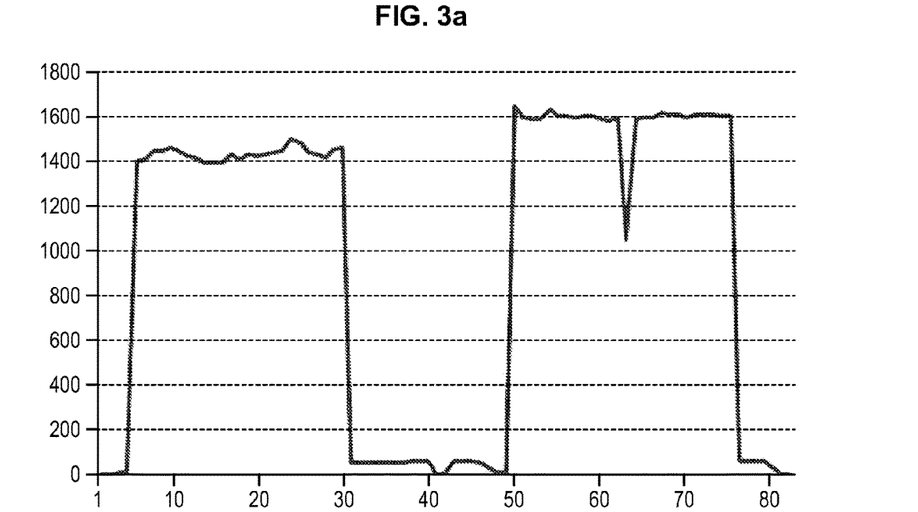
FIGS. 3a, 3b, 3c and 3d illustrate the different operating phases of different types of dishwasher.
Figure 3B:
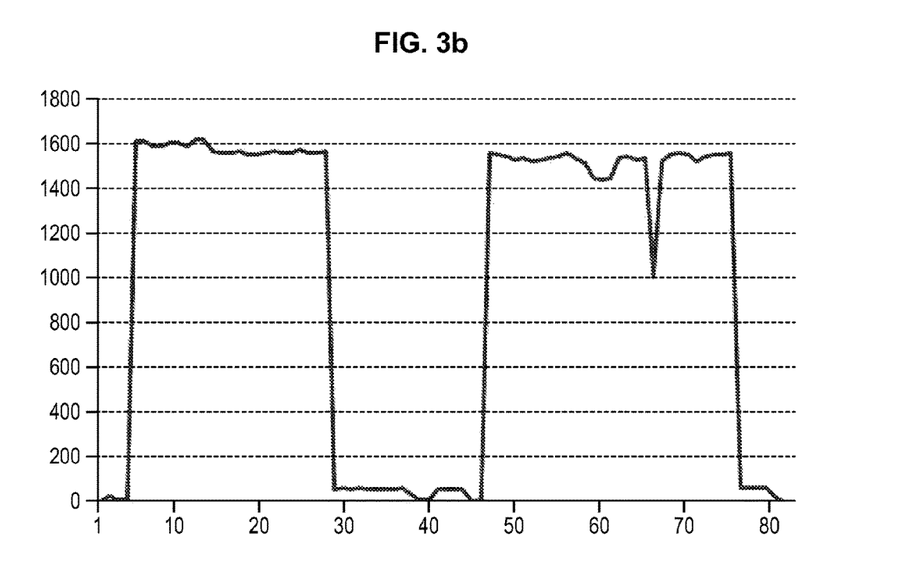
Figure 3C:
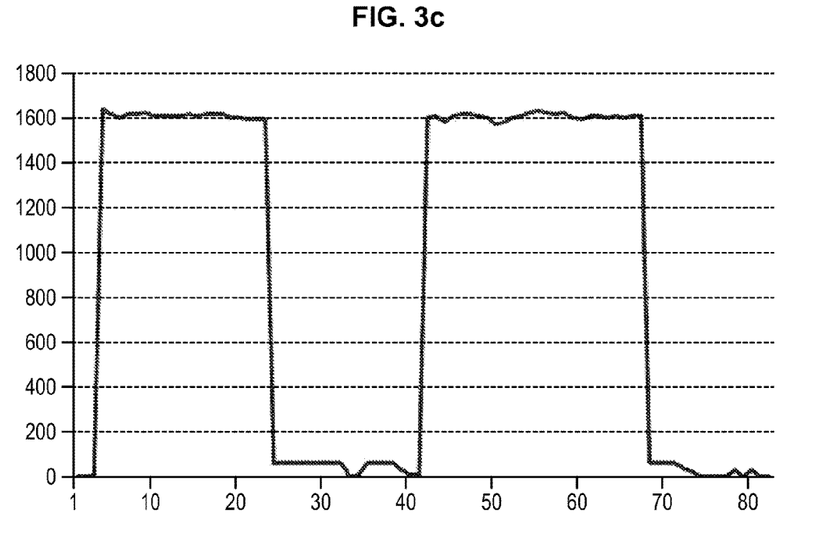
Figure 3D:
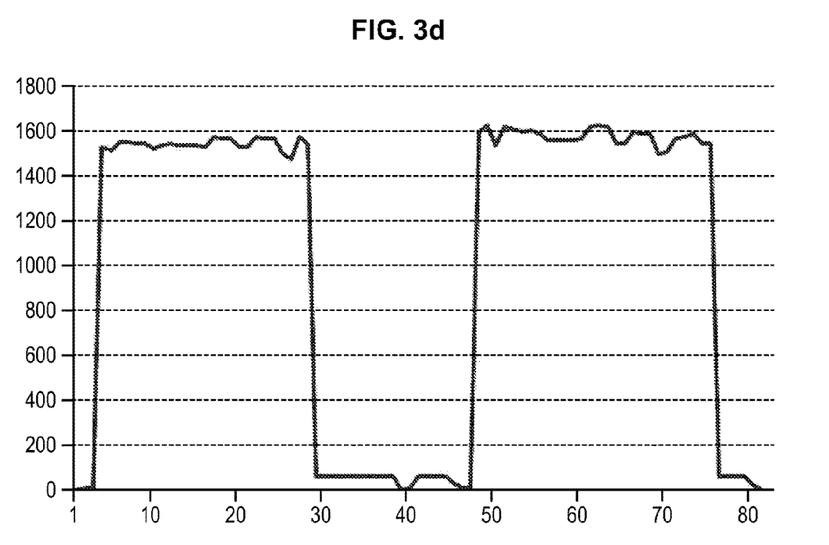

By way of second example and as illustrated in FIG. 3a, a dishwasher can have a first operating phase corresponding to a first washing of a duration of 25 minutes with consumed power of 1400 Watt, a second operating phase of a duration of 20 minutes with consumed power of 50 Watt corresponding to a pause phase, a third operating phase corresponding to a second wash phase of a duration of 30 minutes with consumed power of 1600 Watt and a fourth operating phase corresponding to a drying phase of a duration of 5 minutes with power consumed of 50 Watt.

Finally, a maximum interruption duration can be associated with each phase, corresponding to the maximum duration during which the phase can be interrupted without harming the quality of the service provided by the appliance executing this operating phase. Some phases of some domestic appliances can have a maximum interruption duration equal to 0 if the phases of these appliances cannot be interrupted without harming the quality of the service provided.

By way of first example, the maximum interruption duration of the washing phase of the washing machine can be 0 minute while the maximum interruption duration of the spin phase of the washing machine can be 20 minutes. In fact interrupting a washing machine during the washing phase causes cooling of water, risking an unpleasant odour being imparted to the clothes.

By way of second example, for a dishwasher whereof the operating phases are illustrated in FIG. 3a, the maximum interruption duration of the first wash phase can be 20 minutes, that of the pause phase can be 20 minutes, that of the second wash phase can be 20 minutes, and that of the drying phase can be 0 minute.

The system also comprises a data-processing module MT capable of being connected to the LAN network and configured to manage power consumption of said domestic appliances D1 to Dn. The data-processing module can be integrated into a dedicated appliance, or else into one of the appliance D1 to Dn of the network, in particular into the gateway GW of the network.

The gateway GW of the network or "box" is by definition the core of a local communications network. All other appliances of the network are connected to it and it already exchanges messages with these appliances via its routing function. This appliance is in fact that which controls the network, and therefore naturally has a position of coordinator. Also, it is much less often switched off than others since it often ensures 24 hours a day Internet connectivity. It also generally already has adequate processing means for performing those operations conducted by the data-processing module. It is therefore the best appliance for managing power consumption of the other appliances of the network.

In a variant, the data-processing module MT is integrated into an appliance external to the local network, such as an appliance of a service provider, for example an appliance of the electricity provider of the user of appliances D1 to Dn.

To manage the power consumption of domestic appliances, the data-processing module first acquires information relative to operating phases in progress or yet to come for at least two domestic appliances. These appliances are domestic appliances switched on by the user whereof the operation will move through one or more phases each potentially having power different consumption. The information acquired by the processing module and relative to an operating phase for a domestic appliance comprise especially power consumed by said domestic appliance during this phase.

The processing module MT then tries to minimise the total maximum power consumed by said at least two domestic appliances, called consumption peak, from information acquired. For this, the processing module MT can estimate the total power which will be consumed by all these appliances despite their different operating phases by accumulating the power consumed by each appliance for which the processing module has acquired information; then the processing module MT determines at least one operating phase of one of said appliances to be interrupted so as to minimise the consumption peak. By interrupting the operation of one of the appliances during a certain time, the power consumption of this appliance is deferred, without modifying the service provided to the user since the interrupted operating phase is then resumed to expire. Such offset over time of the power consumption of a domestic appliance can diminish the total power consumption of all the appliances during at least part of the consumption peak, reducing the duration of the latter. If the total consumption of the appliances is diminished during the entire consumption peak, the amplitude of this peak will be diminished. It is possible that the instant of total maximum consumption during operating phases yet to come of the various appliances in operation is modified, defining a new consumption peak of amplitude less than that estimated previously. During this step of the method, the processing module must therefore determine, of those appliances on which it has information, which appliance must have its operation interrupted and which operating phase of this appliance must be interrupted to minimise if possible the amplitude of the consumption peak yet to come during operating phases of the different appliances in operation.

Finally, the processing module interrupts said at least one determined operating phase.

Figure 4A:
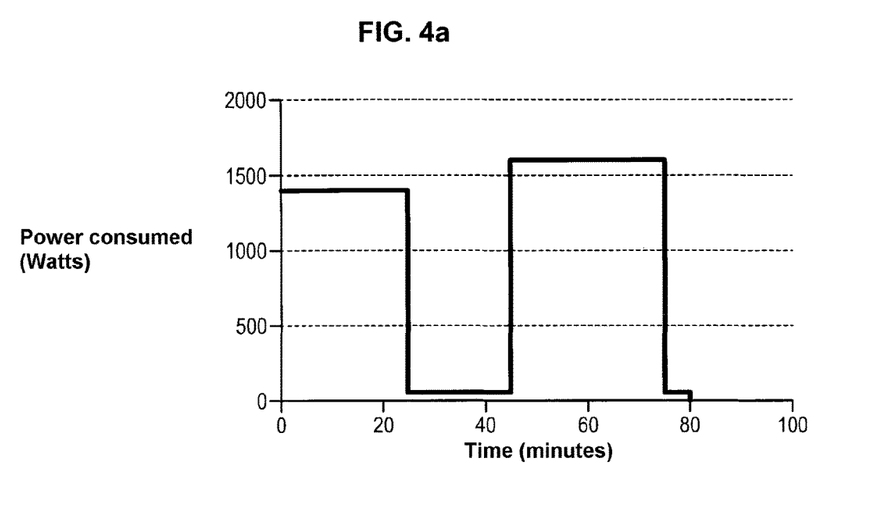
FIGS. 4a, 4b, 4c, 4d illustrate an embodiment of a method for controlling the power consumption of domestic appliances for a system comprising a dishwasher and a washing machine.
Figure 4B:
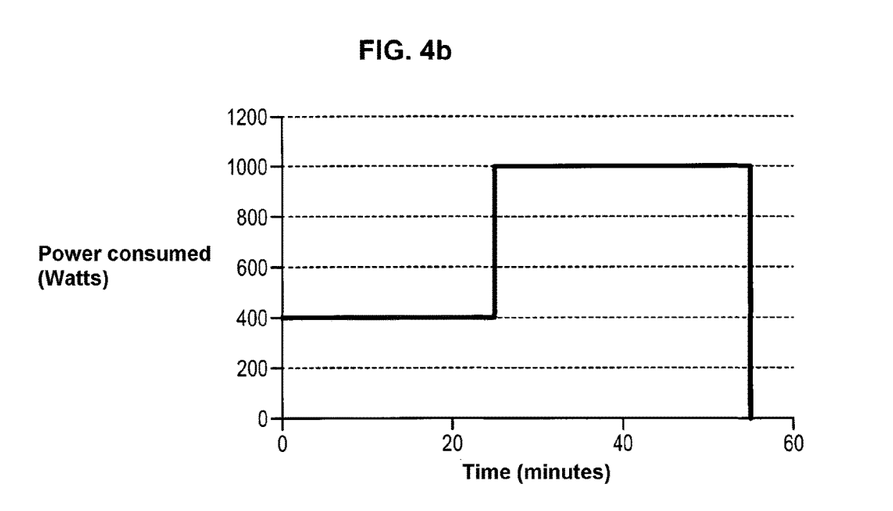
Figure 4C:
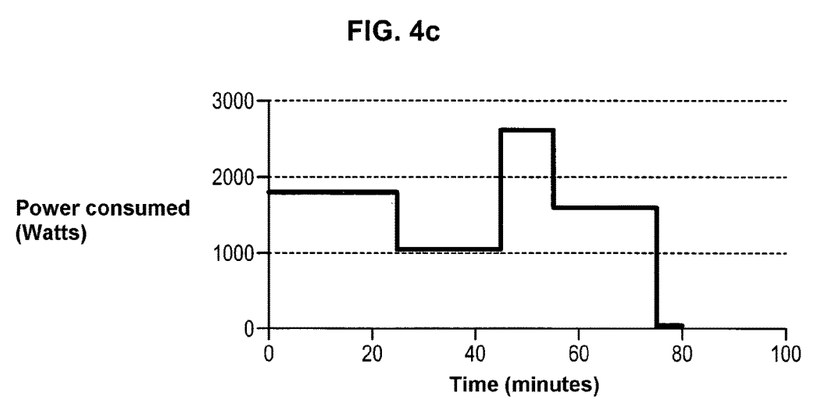

By way of example, power consumption levels during different operating phases of a washing machine and a dishwasher are illustrated respectively in FIG. 4a and in FIG. 4b. The total consumption resulting from the two appliances is illustrated in FIG. 4c and shows a consumption peak of 2600 Watt after around 50 minutes of operation of both appliances. This peak results from the accumulation of the third phase of the dishwasher and of the second phase of the washing machine, both very power-hungry.

Figure 4D:
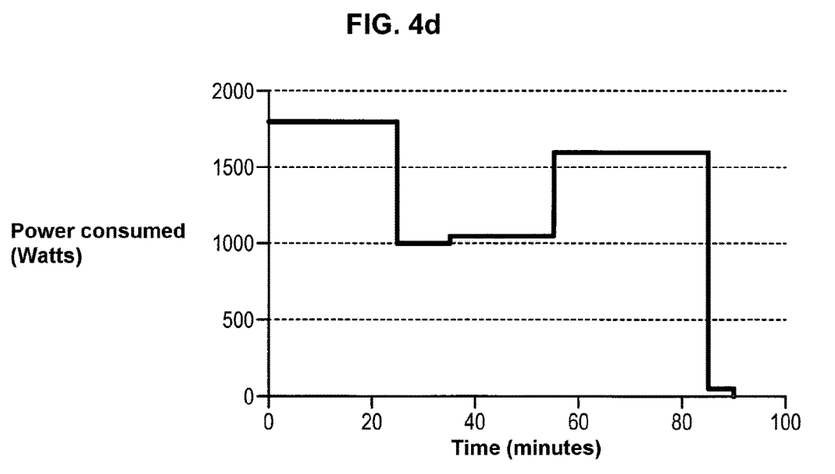

The processing module determines that the operating phase to be interrupted is the second operating phase of the dishwasher. In fact, even though this operating phase has low consumption, interruption of this phase over 10 minutes expects that the second phase of the washing machine is finished before the third phase of the dishwasher is initiated. So the power consumption of both appliances during these phases no longer accumulates and the consumption peak of 2600 Watt previously determined is replaced by maximum provided consumption of 1800 Watt at start of operation during the first phases of each of the appliances, as illustrated in FIG. 4d. The implementation of the method has reduced maximum power consumption by around 30%.

According to an embodiment, information exchanges between the domestic appliances and the processing module MT over the local network LAN can be carried out by means of protocol UPnP ("Universal Plug 'n' Play"). Such protocol lets the appliances connect easily to the network and share information especially on their operating phases over the network. The processing module plays the role of UPnP control point and interacts with the appliance by means of UPnP services and actions proposed by the latter. By way of example, the following actions can be proposed by each of the domestic appliances:

GetPowerConsumption for obtaining the instantaneous consumption of a domestic appliance, GetListOfCycles for obtaining the consumption and projected duration of each of the phases yet to come of a domestic appliance as well as the maximum interruption duration possible of each of these phases, GetCurrentCycleInfo for obtaining information on the status of the current operating phase of a domestic appliance (started, paused, stopped, start-up forced by the user . . . ) as well as time remaining to terminate the phase in progress, InterruptCycle for letting the processing module interrupt the phase in progress of an appliance.

Figure 5:
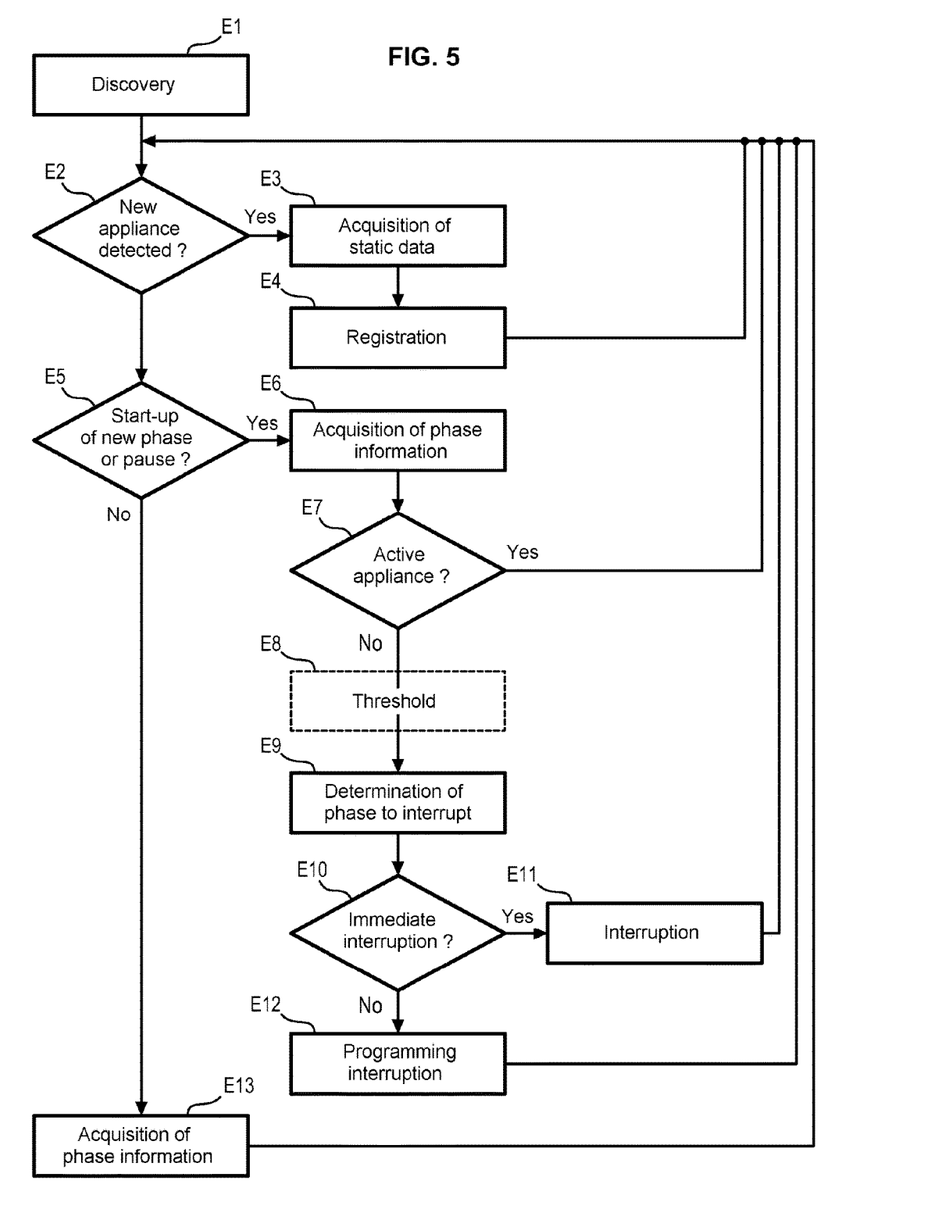
FIG. 5 is a diagram showing an embodiment of a method for managing the power consumption of a plurality of domestic appliances according to the invention.

More precisely, and in reference to FIG. 5 illustrating an implementation of the method according to the invention, in a first discovery step E1, the processing module MT carries out a discovery method of the domestic appliances D1, . . . , Dn connected to the local communications network LAN.

For this, in a first variant of implementation, the processing module MT can receive messages sent by each domestic appliance when connected to the local network LAN, for example during powering-up or during launch of an operating phase by a user. Such a message can comprise a URL address for accessing an XML file comprising static data for giving a description of the domestic appliance. In terms of an implementation by means of UPnP protocol, these messages can be SSDP messages ("Simple Service Discovery") "alive" sent to a multicast address by the domestic appliances. An example of such a message sent by a washing machine is given in annex 1.

In a second variant of implementation, the processing module MT itself can initiate a discovery process of domestic appliances connected to the local communication network. Such a process can be launched during connection of the processing module to the network to detect those appliances which already would be connected thereto, quite particularly in the event where domestic appliances stay connected to the network permanently once they are powered. The processing module sends a request message over the network, for example of "M-SEARCH request" type given in annex 2. In response to this request, the domestic appliances are identified with the processing module by sending it messages.

In a second detection step E2, from the messages received during the first step E1 the processing module determines whether a new appliance has been detected.

In a third acquisition step of static data E3, the processing module acquires static data supplied by the newly discovered domestic appliances. The processing module can access these data via the URL address included in the message sent by said domestic appliance at the first discovery step described hereinabove.

These static data give a description of a domestic appliance and can comprise a serial number, the name of the manufacturer, the model of the appliance, type of appliance, software version etc. This lets the processing module stay updated on an inventory of appliances connected to the network capable of consuming power and whereof the processing module can try to interrupt an operating phase to minimise the estimated consumption peak. Such knowledge is necessary so that the processing module knows which appliance to contact during interrogation operations of appliances described hereinbelow.

An example of an HTML file accessible from the URL address contained in the "alive" message sent by a washing machine and comprising such static data is presented in annex 3.

In a fourth registration step E4 the processing module can send each new discovered appliance a subscription message so that in the future this appliance notifies the processing module MT of events concerning it such as start-up, pausing or finish of an operating phase. The start-up, pausing or end of a phase is in fact a particular instant during which the power consumed risks changing and during which the relevant appliance can update its estimation of durations and consumption of cycles yet to come. Knowledge of these events by the processing module is therefore necessary so the latter can keep its consumption projections updated and try to conserve a consumption peak as reduced as possible.

Such a subscription message can contain a response address of URL type to which the appliance is to send its notification messages to alert the processing module to the occurrence of an event. An example of a subscription message is provided in annex 4.

These four steps let the processing module have knowledge of the appliances connected to the network and ask to be alerted to changes in operating phase of the appliances. The processing module must also know the operating phases of these appliances and the associated power consumption levels.

During a fifth start-up or pausing step E5, the processing module MT determines that a new operating phase has started on a domestic appliance or the user has paused one of the operating phases. The processing module MT can perform this determination on receipt of a notification message sent by the domestic appliance itself. In terms of an implementation according to UPnP protocol, an example of a notification message of GENA type is presented in annex 5. The processing module can receive this notification message after having sent the domestic appliance a request to recover from the latter information on the operating phase in progress on this appliance. In terms of an implementation by means of UPnP protocol such a request can be made by means of the GetCurrentCycleInfo action described hereinabove.

During a sixth step of information acquisition of phase E6, the processing module acquires information relative to operating phases of a domestic appliance after start-up of a new phase on the latter or pausing of an operating phase, such start-up or pausing being determined by the processing module during the fifth start-up step E5. For this to happen, the processing module interrogates a domestic appliance for which it has determined the start-up of a new operating phase or pausing by the user during the fifth step E5. For each of its phases the domestic appliance can indicate the projected duration and power consumption of this phase and the maximum interruption duration supported by this phase. In terms of an implementation by means of UPnP protocol such interrogation can be performed by means of the GetListOfCycle action described hereinabove. This lets the processing module get information required for estimation of a consumption peak and its minimisation.

During a seventh determination step of the number of active appliances E7, the processing module determines if at least two domestic appliances are connected to the local network and are using power. If the processing module determines that a single domestic appliance is using power, it cannot minimise the consumption peak produced by this appliance. But if the processing module determines that at least two appliances are working and using power, it can try to minimise the consumption peak produced by simultaneous operation of these at least two appliances.

During a ninth determination step of an operating phase to be interrupted E9, the processing module determines at least one domestic appliance and an operating phase of said at least one appliance to be interrupted so as to minimise the total maximum power consumed by the appliance in operation. This ninth step is performed only if the processing module has determined that at least two appliances are active during the seventh determination step of the number of active appliances. According to a first variant the processing module determines a single phase to be interrupted. This variant of the ninth step will be detailed later in reference to FIG. 6. According to a second variant, the processing module can try to minimise the consumption cost by interrupting several operating phases.

In an embodiment, prior to the ninth determination step of at least one operating phase to be interrupted and during an eighth comparison step E8, the data-processing module can compare the amplitude of the consumption peak to a preset threshold. This threshold can be a consumption threshold not to be exceeded fixed by a service provider. The method for managing the power consumption described can be executed when the consumption peak reaches a predetermined percentage of said threshold, for example 75 percent. This does not interrupt the phase if the total maximum consumption remains sufficiently low so as not to delay execution of the operating phases without real need.

During a tenth interruption step E10 the processing module determines if the operating phase to be interrupted is in progress. If that is the case the module immediately interrupts the operating phase to be interrupted during an eleventh interruption step E11. For this to happen, the processing module orders the relevant appliance interruption of the operating phase to be interrupted during an interruption duration determined during the ninth step as described hereinbelow. In terms of an implementation by means of UPnP protocol such action can be undertaken by means of the InterruptCycle action described hereinabove. An example of interruption message sent by the processing module to a domestic appliance whereof an operating phase must be interrupted is presented in annex 6. This instantly reduces the duration and/or amplitude of the consumption peak.

If the operating phase to be interrupted is not being implemented, during a twelfth interruption programming step E12, the processing module can program interruption of said at least one determined operating phase at a later time, for an interruption duration determined during the ninth step as described hereinbelow. So the consumption peak to be avoided could be minimised from launch of the operating phase which would have caused its apparition.

Also, during a thirteenth acquisition step E13, the processing module MT can be configured to repeatedly acquire information relative to operating phases in progress or yet to come of domestic appliances connected within the network. This acquisition repeated over time lets the processing module update information previously acquired relative to the operating phases of an appliance. During an operating phase the latter can in fact update its estimation of the duration of this phase and of the power consumption during this phase. For example during a washing phase of a washing machine, cold water having a temperature varying from one washing phase to another must first be heated and the duration and the power consumed estimated for said washing phase can be updated by the washing machine once the water temperature required for washing is reached. Such repeated acquisition can also let the processing module track follow-up histograms of the consumption of each domestic appliance. These histograms can then be displayed for the user. In terms of an implementation by means of UPnP protocol such acquisition can be done by means of GetListOfCycle and GetPowerConsumption actions described hereinabove.

Figure 6:
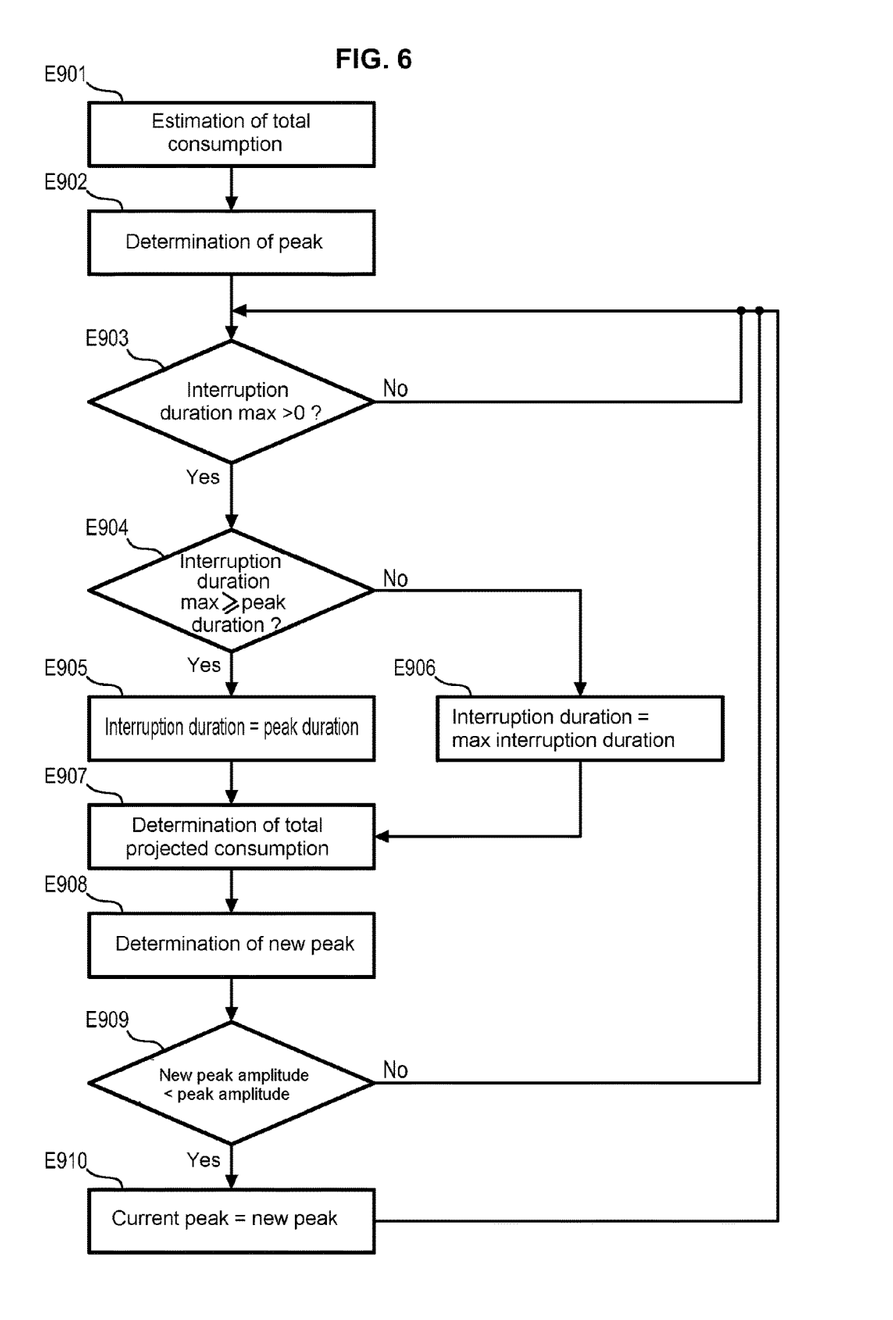
FIG. 6 is a diagram showing an embodiment of the determination step of an operating phase to be interrupted according to the invention.

An example of detailed implementation of the ninth determination step of an operating phase to be interrupted is illustrated in FIG. 6.

During a first sub-step E901 for estimation of the total consumption of the appliances the processing module estimates the total electric power consumed over time by all the domestic appliances connected within the local network from information acquired during execution preceding the sixth consumption information acquisition step E6 and/or of the thirteenth acquisition step E13. The processing module then determines the amplitude of the consumption peak and its duration during a second sub-step E902. The processing module has knowledge of the peak to be minimised and can then determine an operating phase interruption to minimise this peak.

The processing module then determines for each operating phase of each domestic appliance if the maximum interruption duration of said operating phase is greater than 0 during a third sub-step E903.

If this is not the case, the operating phase of said domestic appliance cannot be interrupted and the processing module must try another phase to be interrupted.

Inversely, if said operating phase can be interrupted, the processing module can envisage interrupting said operating phase during an interruption duration less than or equal to the maximum interruption duration.

In a variant of implementation illustrated in FIG. 6 the processing module determines during a fourth sub-step E904 if the maximum interruption duration is greater than or equal to the duration of the consumption peak.

If the maximum interruption duration is greater than or equal to the duration of the consumption peak, the processing module can envisage during a fifth sub-step E905 according to a first variant illustrated in FIG. 6 interrupting said operating phase for an interruption duration equal to the duration of the consumption peak. Power consumption will be diminished for the entire duration of the peak determined initially and the amplitude of this peak is therefore diminished. According to a second variant not illustrated, the processing module can envisage interrupting said determined operating phase during an interruption duration voluntarily less than or equal to the duration of the consumption peak even though the latter is less than the maximum interruption duration. Such a variant can be applied during an attempt to minimise the consumption peak benefiting from interruption of several operating phases, capable of further minimising the consumption peak.

If the maximum interruption duration is less than the duration of the consumption peak, during a sixth sub-step E906 and according to a first variant illustrated in FIG. 6, the processing module can envisage interrupting said operating phase for an interruption duration equal to the maximum interruption duration. This shortens the duration of the consumption peak, to the extent where it is possible to do this without degrading the quality of the service provided by the appliance whereof the operating phase is interrupted. According to a second variant not illustrated, the processing module can envisage interrupting said operating phase during an interruption duration voluntarily less than the maximum interruption duration and the duration of the consumption peak, for example in the case of interruption of several operating phases.

During a seventh sub-step E907, the processing module determines the new projected total consumption of all the appliances given the at least one phase interruption envisaged during the fifth or sixth sub-steps.

During an eighth sub-step E908, the processing module determines the amplitude and duration of the new consumption peak.

During a ninth sub-step E909, the processing module determines if the new consumption peak has an amplitude less than that of the former consumption peak. If this is the case, the envisaged interruption, i.e., the phase to be interrupted and the interruption duration, is stored and the new consumption peak is kept as current consumption peak during a tenth sub-step E910. The processing module then conducts the third to tenth sub-steps for a new operating phase of the domestic appliance or a new domestic appliance.

When the processing module has conducted the third to tenth sub-steps for all the operating phases of the plurality of domestic appliances connected within the local network, the data-processing module keeps the last interruption stored as optimal interruption. The processing module has determined the at least one operating phase of said domestic appliance to be interrupted as well as the instant and duration of the interruption of this operating phase so as to minimise the consumption peak.

During the eleventh or twelfth step, the processing module can interrupt the operating phase to be interrupted for an interruption duration less than or equal to the maximum interruption duration, optionally equal to the duration of the consumption peak when the maximum interruption duration is greater than or equal to the duration of the consumption peak, or else equal to the maximum interruption duration when the latter is less than the duration of the consumption peak. This minimises as far as possible the consumption peak, in respect of the maximum interruption durations of the operating phases, ensuring an absence of degradation of the service provided by the appliance.

Figure 7:
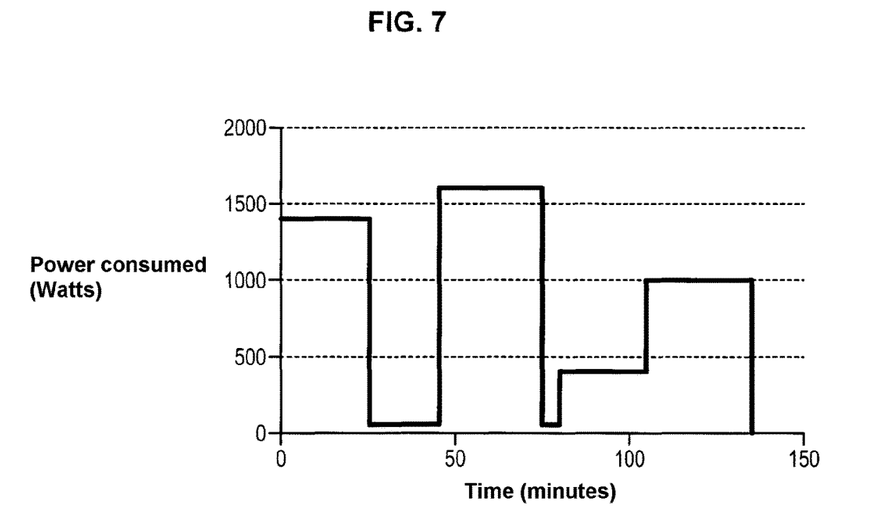
FIG. 7 illustrates the effect of sequential start-up of domestic appliances on the total power consumed.

In an embodiment during the ninth step the data-processing module can determine at least one operating phase of one of said appliances to be interrupted so as to make a compromise between reduction in the consumption peak and offset over time of the different programs, for example to minimise the interruption duration of the operating phases of the domestic appliances. This compromise can be parameterised by the user, the operator, or by a learning algorithm. In reference again to the example illustrated in FIGS. 4a, 4b, 4c and 4d, if the user prefers minimisation of the consumption amplitude to the detriment of the interruption duration, the processing module can decide to sequentially start up the washing machine then the dishwasher, or the reverse, so that the consumption peak does not exceed 1600 Watt, as illustrated in FIG. 7. But the end of the program of the washing machine will be delayed by 80 minutes or the end of the program of the dishwasher will be delayed by 55 minutes.

Finally, in another embodiment, the data-processing module MT can determine at least one operating phase of one of said appliances to be interrupted during the ninth step E9 as a function of the segmentation during peak and off-peak hours. This embodiment takes into consideration during determination of operating phases to be interrupted the variations in power rates to minimise the cost of total power consumed for the user.

Annex 1

NOTIFY * HTTP/1.1
HOST: 239.255.255.250:1900
CACHE-CONTROL: max-age = seconds until advertisement expires
LOCATION: URL for UPnP description for root device
NT: urn:schemas-upnp-org:device:Washer1
NTS: ssdp:alive
SERVER: OS/version UPnP/1.0 product/version
USN: advertisement UUID Annex 2

M-SEARCH * HTTP/1.1
HOST: 239.255.255.250:1900
MAN: "ssdp:discover"
MX: seconds to delay response
ST: urn:schemas-upnp-org:device:Washer:1

Annex 3

```
<?xml version="1.0"?>
<root xmlns="urn:schemas-upnp-org:device-1-0">
  <specVersion>
     <major>1</major>
     <minor>0</minor>
  </specVersion>
  <device>
     <deviceType>urn:schemas-upnp-org:device:Washer:1</deviceType>
     <friendlyName>My Washer</friendlyName>
     <manufacturer>Grunding</manufacturer>
     <modelName>model name</modelName>
     <modelNumber>model number</modelNumber>
     <modelURL>URL to model site</modelURL>
     <serialNumber>manufacturer's serial number</serialNumber>
     <UDN>uuid:UUID</UDN>
     <serviceList>
       <service>
          <serviceType>urn:schemas-upnp-org:service:Appliance:1</serviceType>
          <serviceId>urn:upnp-org:serviceId:Appliance1</serviceId>
          <SCPDURL>URL to service description</SCPDURL>
          <controlURL>URL for control</controlURL>
          <eventSubURL>URL for eventing</eventSubURL>
       </service>
```

Annex 3

```
    </serviceList>
  </device>
</root>
```

Annex 4

```
SUBSCRIBE publisher path HTTP/1.1
HOST: publisher host:publisher port
CALLBACK: <delivery URL>
NT: upnp:event
TIMEOUT: Second-requested subscription duration
```

Annex 5

```
NOTIFY delivery path HTTP/1.1
HOST: delivery host:delivery port
CONTENT-TYPE: text/xml
CONTENT-LENGTH: Bytes in body
NT: upnp:event
NTS: upnp:propchange
SID: uuid:subscription-UUID
SEQ: event key
<?xml version="1.0"?>
<e:propertyset xmlns:e="urn:schemas-upnp-org:event-1-0">
<e:property>
<CycleStatus>STARTED_BY_USER</CycleStatus>
</e:property>
</e:propertyset>
```

Annex 6

```
POST path of control URL HTTP/1.1
HOST: host of control URL:port of control URL
CONTENT-LENGTH: bytes in body
CONTENT-TYPE: text/xml; charset="utf-8"
SOAPACTION:
"urn:schemas-upnp-org:service:Appliance:1#InterruptCycle"
<?xml version="1.0"?>
<s:Envelope
xmlns:s="http://schemas.xmlsoap.org/soap/envelope/"
s:encodingStyle="http://schemas.xmlsoap.org/soap/encoding/">
<s:Body>
<u:InterruptCycle
xmlns:u="urn:schemas-upnp-org:Appliance:InterruptCycle:1">
<InterruptionDelay>in arg value</InterruptionDelay>
</u:InterruptCycle>
</s:Body>
</s:Envelope>
```

The invention claimed is:

1. A method comprising:
managing power consumption of a plurality of domestic appliances connected within a local communications network, the operation of at least two domestic appliances having one or more operating phases, wherein managing comprises the following acts implemented by a data-processing module capable of being connected to the local communications network:
acquiring information relative to operating phases in progress or yet to come for at least two domestic appliances, the information relative to an operating phase for a domestic appliance comprising the power consumed by said domestic appliance during this phase and a maximum interruption duration of said phase,
determining as a function of the acquired information, at least one operating phase of one of said appliances to be interrupted so as to make a compromise between total maximum power consumed by said at least two domestic appliances, so-called consumption peak and offset over time of different programs, so as to minimise duration of the interruption of the operating phases of the domestic appliances,
interrupting said determined operating phase during an interruption duration less than or equal to the maximum interruption duration, and wherein the interruption duration is equal to a duration of the consumption peak when the maximum interruption duration is greater than or equal to the duration of the consumption peak.

2. The method according to claim 1, wherein the data-processing module acquires the information relative to operating phases in progress or yet to come of domestic appliances, after startup by one of said domestic appliances of a new operating phase or a pausing by a user of an operating phase.

3. The method according to claim 1, wherein the data-processing module repeatedly acquires the information relative to operating phases of domestic appliances.

4. The method according to claim 1, wherein said data-processing module interrupts said determined operating phase during an interruption duration equal to the maximum interruption duration when the maximum interruption duration is less than the duration of the consumption peak.

5. The method according to claim 1, wherein prior to the determination step of at least one operating phase to be interrupted, the data-processing module compares the amplitude of the consumption peak to a preset threshold.

6. The method according to claim 1, wherein the processing module programs the interruption of said operating phase at a later time.

7. An apparatus comprising:
a processor; and
a non-transitory computer-readable medium comprising code instructions, which when executed by the processor configure the processor to perform acts comprising:
a processor capable of being connected to a local communications network; and
a non-transitory computer-readable medium comprising code instructions, which when executed by the processor configure the processor to perform acts comprising:
acquiring information relative to operating phases in progress or yet to come for at least two domestic appliances connected within the local communications network and functioning according to several operating phases, said information relative to an operating phase for a domestic appliance comprising the power consumed by said domestic appliance during this phase and a maximum interruption duration of said phase,
determining, as a function of the acquired information, at least one operating phase of one of said appliances to be interrupted so as to make a compromise between the total maximum power consumed by said at least two domestic appliances, so-called consumption peak and offset over time of different programs, so as to minimise duration of the interruption of the operating phases of the domestic appliances, and interrupting said determined operating phase during an interruption duration less than or equal to the maximum interruption duration, and wherein the interruption duration is equal to a duration of the consumption peak when the maximum interruption duration is greater than or equal to the duration of the consumption peak.

8. The apparatus of claim 7, further comprising a gateway comprising the processor.

9. The apparatus of claim 7, comprising a power consumption management system comprising a plurality of domestic appliances connected within the local communications network and a gateway comprising the processor.

10. A non-transitory computer-readable medium comprising instructions stored thereon for execution of a method for managing power consumption of a plurality of domestic appliances connected within a local communications network, when this program is executed by a processor connected to the local communications network, wherein the instructions configure the processor to perform acts comprising:

managing power consumption of the plurality of domestic appliances connected within the local communications network, the operation of at least two domestic appliances having one or more operating phases, wherein managing comprises:

acquisition of information relative to operating phases in progress or yet to come for at least two domestic appliances, the information relative to an operating phase for a domestic appliance comprising the power consumed by said domestic appliance during this phase and a maximum interruption duration of said phase, determination as a function of the acquired information, of at least one operating phase of one of said appliances to be interrupted so as to make a compromise between the total maximum power consumed by said at least two domestic appliances, so-called consumption peak and offset over time of different programs, so as to minimise duration of the interruption of the operating phases of the domestic appliances, and interruption of said determined operating phase during an interruption duration less than or equal to the maximum interruption duration, and wherein the interruption duration is equal to a duration of the consumption peak when the maximum interruption duration is greater than or equal to the duration of the consumption peak.

\* \* \* \* \*